United States Patent
Stoica et al.

(10) Patent No.: US 8,594,126 B2
(45) Date of Patent: Nov. 26, 2013

(54) RECEIVING NODE IN A PACKET COMMUNICATIONS SYSTEM AND METHOD FOR MANAGING A BUFFER IN A RECEIVING NODE IN A PACKET COMMUNICATIONS SYSTEM

(75) Inventors: Florin-Laurentiu Stoica, Sibiu (RO); Mihai Neghina, Craiova (RO); Adrian Raileanu, Bucharest (RO)

(73) Assignee: Freescale Semiconductor, Inc., Austin, TX (US)

( * ) Notice: Subject to any disclaimer, the term of this patent is extended or adjusted under 35 U.S.C. 154(b) by 62 days.

(21) Appl. No.: 13/255,250

(22) PCT Filed: Mar. 31, 2009

(86) PCT No.: PCT/IB2009/051354
§ 371 (c)(1),
(2), (4) Date: Sep. 8, 2011

(87) PCT Pub. No.: WO2010/112975
PCT Pub. Date: Oct. 7, 2010

(65) Prior Publication Data
US 2012/0008641 A1    Jan. 12, 2012

(51) Int. Cl.
*H04L 12/28* (2006.01)
*H04L 12/56* (2011.01)
*H04J 3/16* (2006.01)
*H04J 3/22* (2006.01)

(52) U.S. Cl.
USPC .......................................... 370/465; 370/412

(58) Field of Classification Search
USPC .................................. 370/412, 465
See application file for complete search history.

(56) References Cited

U.S. PATENT DOCUMENTS 6,452,950 B1    9/2002    Ohlsson et al.
6,665,317 B1    12/2003    Scott (Continued)

FOREIGN PATENT DOCUMENTS

EP    0921666 A2    6/1999

OTHER PUBLICATIONS

International Search Report and Written Opinion correlating to PCT/IB2009/051354 dated May 27, 2011.

*Primary Examiner* — Ronald Abelson

(57) ABSTRACT

A receiving node for receiving data packets in a packet communications system comprises a buffer for storing data packets received at the receiving node and for releasing the stored data packets to an application element of the receiving node. A buffer window defines a time period in which data packets are received at the buffer. A position of the buffer window is moved in time periodically, and a stored data packet is released when it is at an end of the buffer window. The receiving node further comprises a packet delay determining element for determining, for each received data packet, a delay of a received data packet by determining the difference between an estimated time of arrival of a data packet at the receiving node and an actual time of arrival of the data packet at the receiving node, a delay processing element for determining an average of the determined delays of a plurality of data packets and for determining when a change in the determined average is greater than a first threshold, and a buffer window adjusting element for adjusting at a first rate a position of the buffer window by a first amount dependent on the determined average of the determined delays and for switching to adjust a position of the buffer window at a second rate by a second amount dependent on the determined average when a change in the determined average is greater than the first threshold. The second rate is greater than the first rate.

20 Claims, 10 Drawing Sheets

(56) References Cited

U.S. PATENT DOCUMENTS

| | | |
|---|---|---|
| 6,704,329 B2 | 3/2004 | Martin |
| 6,862,298 B1 | 3/2005 | Smith et al. |
| 7,346,005 B1 | 3/2008 | Dowdal |
| 8,358,589 B2 | 1/2013 | Apostol et al. |
| 2003/0152094 A1 | 8/2003 | Colavito et al. |
| 2004/0230824 A1* | 11/2004 | Heil .............................. 713/200 |

* cited by examiner

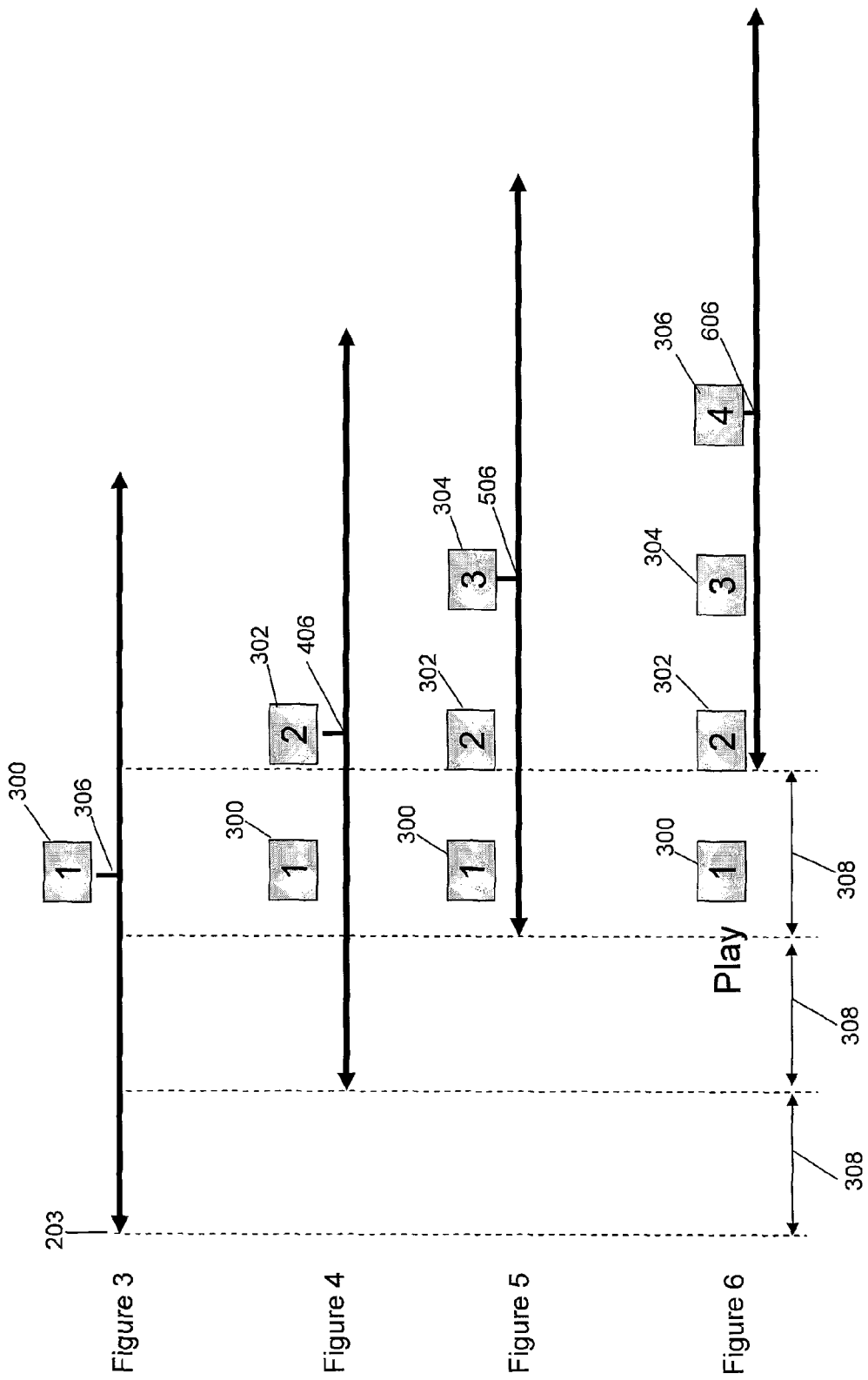

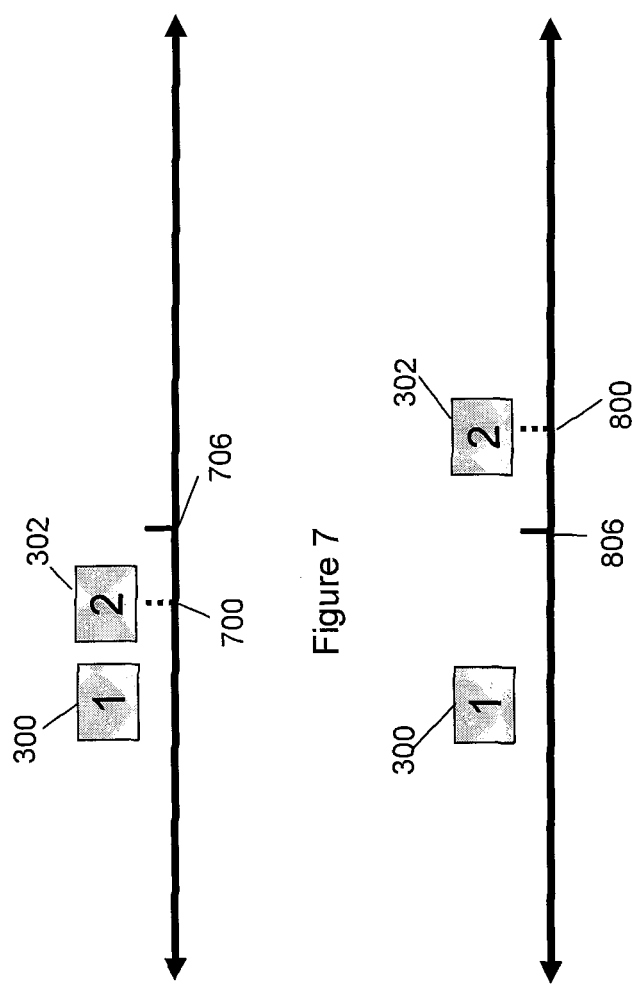

RECEIVING NODE IN A PACKET COMMUNICATIONS SYSTEM AND METHOD FOR MANAGING A BUFFER IN A RECEIVING NODE IN A PACKET COMMUNICATIONS SYSTEM

FIELD OF THE INVENTION

This invention relates to a receiving node for receiving data packets in a packet communications system for storage in a buffer and method for managing a buffer in a receiving node in a packet communications system.

BACKGROUND OF THE INVENTION

In a packet communications system, data packets are transmitted from a transmitting node over one or more networks to a receiving node. For example, the transmitted data packets may be part of a video stream with one or more data packets required to reproduce a frame of the originally created video signal. In this example, the receiving node may be part of a video transcoding gateway which receives video packets of a video stream transmitted in one format (such as a MPEG 4 standard) and translates it into another format (for example H263 standard) for onward transmission to an end user.

The receiving node typically includes a buffer for storing data packets received at the receiving node and for releasing them to an application in the receiving node when called. Variations in the times of arrival of the data packets at the receiving node, typically called jitter delay, can occur due to network congestion, or timing drift. The jitter delays are typically random and can cause data packets to arrive at the receiving node out of sequence and/or with gaps or overlaps. The buffer in the receiving node which receives and stores the received data packets is arranged to smooth out the delays in receipt of the data packets due to jitter and is typically called a jitter buffer. For example, a jitter buffer enables video frames of a video stream to be played with reduced distortion due to jitter. The jitter buffer is typically defined by a buffer length which determines the number of data packets that can be stored in the jitter buffer at a given time and also a parameter known as buffer delay which is selected to correspond to a time period between when a data packet is received at the jitter buffer without delay and when it is released. The length and buffer delay of a jitter buffer is chosen so that the delays due to jitter are compensated for whilst ensuring the data packets are released from the jitter buffer to the application at the receiving node at the required rate and in the proper order to ensure that jitter is removed when the data packets are released. If the jitter buffer length is too small, then too many packets may be discarded or dropped which may lead to a reduction in quality when the packets are released. If the jitter buffer delay is too large, then the additional delay may lead to inefficient releasing of the data packets. For audio applications, the additional delay can lead to conversational difficulty.

Adaptive jitter buffers are known. For example, U.S. Pat. No. 7,346,005 describes a jitter buffer arrangement with adaptive playout of digital packet audio. The jitter buffer arrangement disclosed in this patent calculates jitter delay based upon comparing the arrival time of a current data packet with an expected receive time of the current packet, which is determined from the duration (packet length) and receive time of a previous packet. The difference in the arrival time and the expected receive time or jitter delay is maintained on a running average in real time and is used to set the buffer delay of the jitter buffer when appropriate to allow for proper playout of the received data packets.

U.S. Pat. No. 6,452,950 describes a similar arrangement for adapting the buffer delay based on an estimated variation of packet transmission delay derived from the times of arrival of stored packets using the Real Time Protocol (RTP) to achieve smooth data feed to an application without excessive delays.

U.S. Pat. No. 6,704,329 describes the use of a non-linear pre-filter prior to a low pass filter to remove the effect of network jitter from an error signal representing the difference between actual time of receipt and expected time of receipt of a data packet which is used to control the output data rate from the jitter buffer (that is the buffer delay).

Although these known adaptive arrangements can dynamically change buffer delay to take account of variations in jitter delay, these arrangements take account of variations from a substantially constant delay and so these arrangements cannot adapt quickly to significant changes in the overall transmission delay for example due to network delay changes, such as a change in transmission path, which cause rapid and significant changes to the time of arrival of the data packets at the receiving node.

SUMMARY OF THE INVENTION

The present invention provides a receiving node in a packet communications system for receiving data packets for storage in a buffer and a method for managing a buffer in a receiving node in a packet communications system as described in the accompanying claims.

Specific embodiments of the invention are set forth in the dependent claims.

These and other aspects of the disclosure will be apparent from and elucidated with reference to the embodiments described hereinafter.

BRIEF DESCRIPTION OF THE DRAWINGS

Further details, aspects and embodiments of the disclosure will be described, by way of example only, with reference to the drawings. Elements in the figures are illustrated for simplicity and clarity and have not necessarily been drawn to scale.

FIGS. 3-6 are schematic diagrams showing a buffer window of the jitter buffer, which is part of the receiving node of FIG. 1, over time in an example environment without jitter;

FIGS. 7-8 are schematic diagrams showing a buffer window of the jitter buffer, which is part of the receiving node of FIG. 1, in two different example cases when a data packet is received too late and too early;

DETAILED DESCRIPTION OF THE DRAWINGS

The present invention will be described with reference to a receiving node in a packet communications system for receiving video data packets. It will however be appreciated that the present invention may be used in a receiving node for receiving other types of data packets such as voice.

Figure 1:
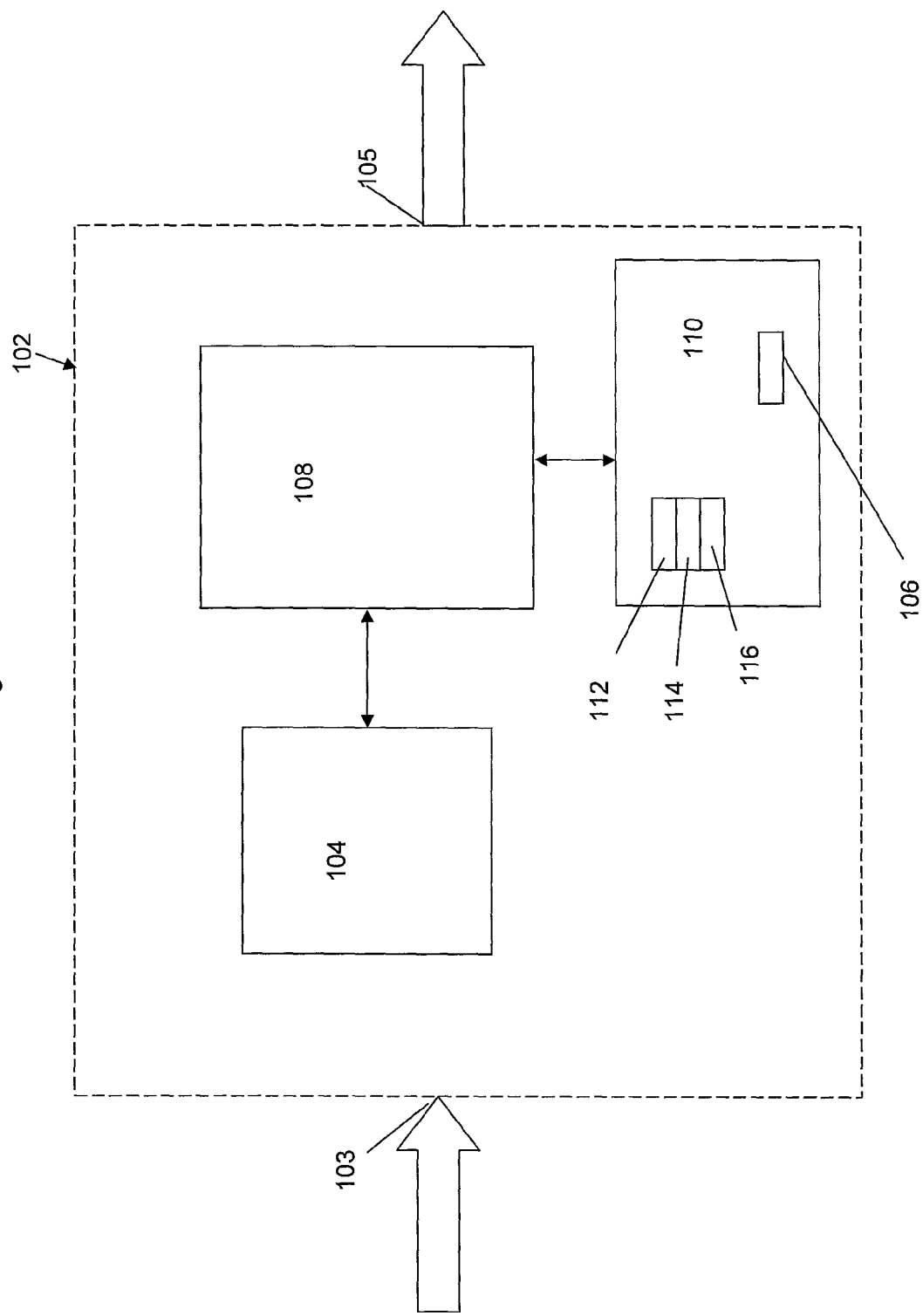
FIG. 1 is a block schematic diagram of a receiving node in accordance with an example of an embodiment of the disclosure.

Referring firstly to FIG. 1, a receiving node 102 in accordance with an example of an embodiment of the disclosure has an input 103 for receiving video data packets which are part of a video stream, an output 105 and further includes a processing unit 108 for carrying out operational processing for the receiving node 102. In an example arrangement, the receiving node 102 may be part of a video transcoding gateway which is arranged to translate video data packets from one standard to another as is well known in the art, and in such an arrangement, the processing unit 108 is typically called a video media resource function processor. The receiving node 102 further comprises a buffer 104 for storing data packets received at the receiving node 102 and for releasing the stored data packets to an application element of the receiving node 102, such as video translation application element 106. The buffer 104, which will be referred to hereafter as a jitter buffer 104, is arranged to minimise the effects of any delays in receipt of data packets at the receiving node 102 so that the data packets are released to an application element in the correct order and in the right 'time reference' as the originally created video stream.

In the examples shown and described in the following, the video data packets are sent according to the Real Time Protocol (RTP) and thus, each data packet includes RTP information such as a RTP timestamp and a sequence number which enables the receiving node 102 to output the video data packets in the correct sequence order and in the right time reference. The RTP timestamp and sequence number are provided by the transmitter or originator of the video stream.

The processing unit 108 may be a single processor or may comprise two or more processors carrying out the processing required for the operation of the receiving node 102. The number of processors and the allocation of processing functions to the processing unit is a matter of design choice for a skilled person. The receiving node 102 also has a program memory 110 in which are stored programs containing processor instructions for operation of the receiving node 102. The programs may contain a number of different program elements or sub-routines containing processor instructions for a variety of different tasks, including, for example, the video translation application element 106 for translating the received data packets from one standard, such as MPEG4, to another standard, such as H263.

In the example shown in FIG. 1, the jitter buffer 104 is shown as being separate to the processing unit 108. It will however be appreciated that the jitter buffer 104 may be part of the processing unit 108 or the program memory 110.

Figure 2:
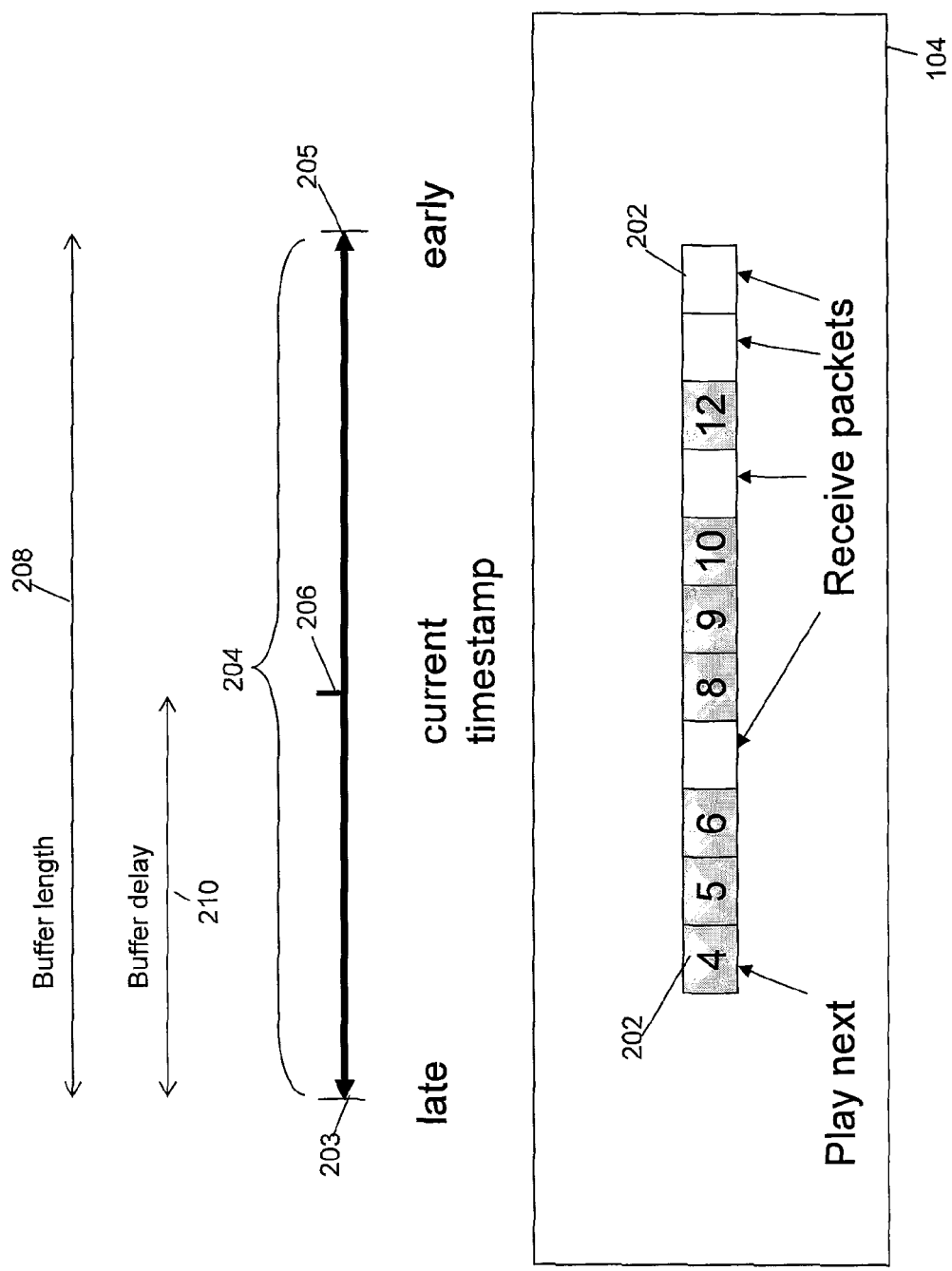
FIG. 2 is a schematic diagram showing a representation of the jitter buffer which is part of the receiving node of FIG. 1.

FIG. 2 shows a representation of the jitter buffer 104. The jitter buffer 104 comprises a plurality of storage locations 202 for storing the received data packets. The different numbers shown in the storage locations 202 correspond to the different sequence numbers of the received data packets. Storage locations 202 are left empty where data packets in a sequence are missing (i.e. have not been received yet). Line 204 represents a buffer window of the jitter buffer 104. The buffer window 204 defines a time period (between ends 203 and 205) in which data packets are received at the jitter buffer 104 and stored in available storage locations 202. The buffer window 204 is moved in time periodically (for example when it is called by an application element or refreshed by the processing unit 108) and a stored data packet is released to an application element when it is at an end 203 of the buffer window 204 and for example when the jitter buffer 104 is next called by the application element. Thus, in the example shown in FIG. 2, the data packet with sequence number 4 is the next packet to be released by the jitter buffer 104. The buffer window 204 is moved periodically, such as for example every 10 ms, so that the data packets stored in the jitter buffer 104 are released in sequence according to the RTP sequence numbers.

As can be seen in FIG. 2, a data packet received after the end 203 of the buffer window 204 is deemed to have been received too late and a data packet received before end 205 of the buffer window 204 is deemed to have been received too early. As will be explained in more detail below, data packets received too late or too early may be dropped by the processing unit 108.

In an example (and as shown in the Figures), a current timestamp 206 of the buffer window 204 is arranged to be in the middle of the buffer window 204. On receipt of a first data packet 300 as shown in FIG. 3, the current timestamp 206 is arranged to take the value of the RTP timestamp of the first data packet 300 and the first data packet 300 received is stored around the middle of the jitter buffer 104. For subsequently received data packets, the current timestamp represents an estimated time of arrival of a subsequent data packet at the receiving node 102. In an ideal transmitting environment without jitter, the current timestamp 206 for each received data packet should correspond to the actual received time.

A time period known as buffer delay 210 corresponds to the time period between the end 203 of the buffer window 204 where a data packet is released and the current timestamp 206. The buffer delay 210, which may be for example 100 ms, is chosen so as to account for maximum expected delays so that data packets are not routinely dropped due to being received too late.

A buffer length 208 of the buffer window 204 may be limited in time or the number of available storage locations 202 of the jitter buffer 104. In the examples described herein, the buffer length 208 is determined by the number of available storage locations 202. So for example, if a data packet arrives too early, if there are available storage locations 202 then the early received data packet is stored but if there are no available storage locations 202, then the early received data packet is dropped. Thus, the buffer window 204 is asymmetric with the end 203 being determined by time and the end 205 being determined by the available storage locations.

FIGS. 3-6 show the buffer window 204 over time in an example ideal transmitting environment in which each of four data packets 300, 302, 304, 306 are received without jitter and so at the expected times represented by the current timestamp 206, 406, 506, 606 for each data packet and the buffer window 204 is moved periodically by a predetermined amount 308. In an example, the predetermined amount 308 is 10 ms and corresponds to when the jitter buffer 104 is called by one of the application elements running on the processing unit 108 or when the jitter buffer 104 is refreshed by the processing unit 108. The first data packet 300 is received and the current timestamp 306 takes the value of the RTP timestamp of the first data packet 300 as shown in FIG. 3. From the RTP timestamp in the first data packet 300, the receiving node 102 can then determine the estimated time of arrival of each of the second, 302, third 304 and fourth 306 data packets at the receiving node 102. The buffer window is then moved by the predetermined amount 308 (that is, advanced in time) so that the first data packet 300 is closer to the end 203 of the buffer window 204 and the second data packet 302 is received at the estimated time of arrival as indicated by the current timestamp 406 as shown in FIG. 4. The buffer window is then moved by the predetermined amount 308 again so that the first data packet 300 is closer to the end 203 of the buffer window 204 and the third data packet 304 is received at the estimated time of arrival as indicated by the current timestamp 506 as shown in FIG. 5. The buffer window is then moved by the predetermined amount 308 again so that the first data packet 300 is at the end 203 of the buffer window 204 and is released to an application element in the receiving node when, for example, the jitter buffer 104 is next called by the application element and the fourth data packet 304 is received at the estimated time of arrival as indicated by the current timestamp 606 as shown in FIG. 6.

FIG. 7 represents an example situation in which instead the second data packet 302 is received later than the expected time of arrival. Thus, the actual time of arrival of the second data packet 302 represented by line 700 in FIG. 7 is later than the estimated time of arrival represented by the current timestamp 706. FIG. 8 represents an example situation in which instead the second data packet 302 is received earlier than the expected time of arrival. Thus, the actual time of arrival of the second data packet 302 represented by line 800 in FIG. 8 is earlier than the estimated time of arrival represented by the current timestamp 806.

The difference between the estimated time of arrival and the actual time of arrival of data packets corresponds to a delay which may be positive or negative depending on whether the packet is received too early or too late and which may be due to jitter delays which as described above are random variations from a substantially constant delay and can occur due to network congestion, or timing drift. The known arrangements described above can reduce the effects of jitter delays by, for example, dynamically changing buffer delay to take account of jitter delay. Such known arrangements however cannot adapt quickly to significant changes in the overall transmission delay due to network delay changes, such as for example, a change in transmission path, which cause rapid and significant changes to the time of arrival of the data packets at the receiving node.

In the example receiving node shown in FIG. 1, the program memory 10 stores specific program elements for controlling the operation of the receiving node 2 by means of the processing unit 108 in order to take account of rapid and significant transmission delays which include a packet delay determining element 112, a delay processing element 114 and a buffer window adjusting element 116. The packet delay determining element 112 determines for each received data packet, a delay of a received data packet by determining the difference between an estimated time of arrival of a data packet at the receiving node 102 and an actual time of arrival of the data packet at the receiving node 102. The delay processing element 114 determines an average of the determined delays of a plurality of data packets and determines when a change in the determined average is greater than a first threshold. The buffer window adjusting element 116 adjusts at a first rate a position of the buffer window by a first amount dependent on the determined average of the determined delays and switches to adjust the position of the buffer window at a second rate by a second amount dependent on the determined average when a change in the determined average is greater than the first threshold, the second rate being greater than the first rate.

Thus, the delay processing element 114 may therefore determine a large change in the average of the determined delays for example due to a network delay change and in response the buffer window adjusting element 116 may then move the buffer window at a faster rate in order to respond quickly to the network delay change.

Figure 9:
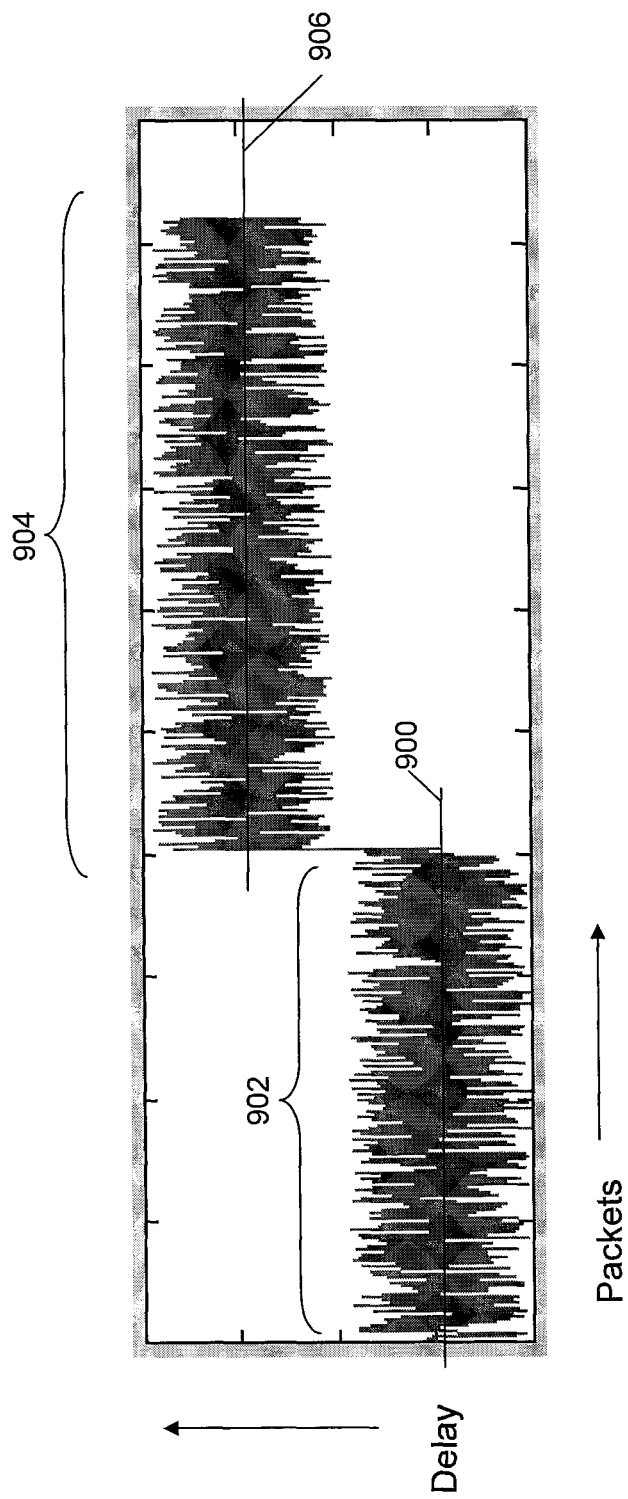
FIG. 9 is a graphical representation showing the delay variations of data packets received at the receiving node of FIG. 1.

The packet delay determining element 112 may determine an estimated time of arrival of a data packet based on the RTP timestamp provided in the received data packets and since the current timestamp of the first received data packet is set to the RTP timestamp. The actual time of arrival of a data packet is provided to the packet delay determining element 112, for example, by a reference clock signal generated by processing unit 108. For example, a 'put' function called by the processing unit 108 provides a data packet to the jitter buffer 104 and the reference clock signal so that the packet delay determining element is provided with the actual time of arrival of the 'put' data packet. The packet delay determining element 112 can then determine a delay of a received data packet. Due to jitter, the delay may vary between each received data packet but as can be seen in FIG. 9, the delay between received data packets varies from a substantially constant delay which is represented by line 900 in FIG. 9 for a group of data packets indicated by the reference numeral 902. The delays of a group of data packets indicated by the reference numeral 904 vary from a substantially constant delay which is represented by line 906 in FIG. 9 but the substantially constant delay line 906 (or average delay) is higher than the constant delay (or average delay) line 900 of the group 902. The jump in average delay between group 902 and 904 may be due to a network delay change, such as a change in network for transmitting the data packets, which results in a higher average delay.

Figure 10:
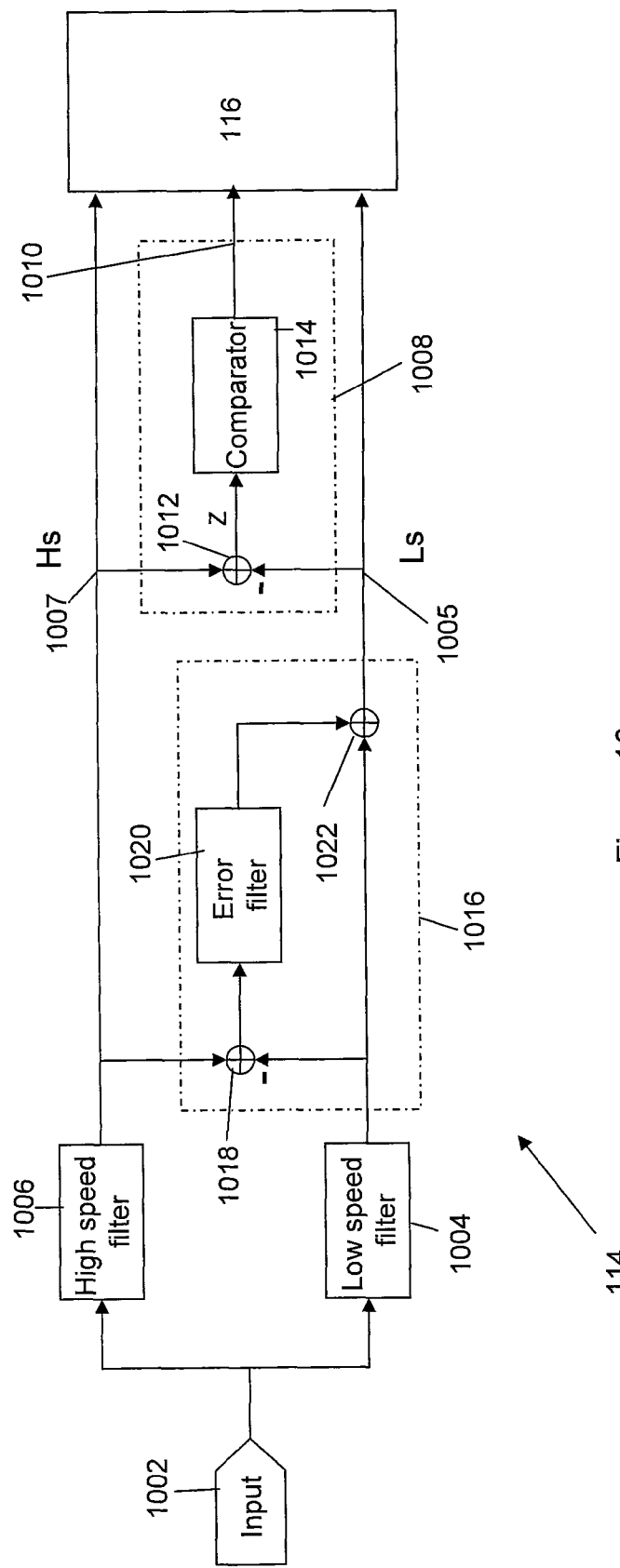
FIG. 10 is a block schematic diagram of a delay processing element in accordance with an example of an embodiment of the disclosure which is part of the receiving node of FIG. 1.

Referring now also to FIG. 10, in an example arrangement, the delay processing element 114 receives the determined delays of the received data packets calculated by the delay determining element 112 at an input 1002 and may include a first averaging element 1004 and a second averaging element 1006. The first averaging element 1004 has a first response time for determining and providing at an output 1005 an average of the determined delays of a plurality of data packets and the second averaging element 1006 has a second response time for determining and providing at an output 1007 an average of the determined delays of the plurality of data packets. The second response time is faster than the first: for example, the second response time of the second averaging element 1006 may be twice as fast as the first response time of the first averaging element 1004. In alternative implementations, the ratio between the second response time and the first response time may be greater than 2. The first averaging element 1004 may be a low speed filter and the second averaging element 1006 may be a high speed filter. Each of the filters may be implemented by any low pass filter such as Finite Impulse Response (FIR), Infinite Impulse Response (IIR) filters, with the band of the low speed filter being narrower than the band of the high speed filter. In the following, the first averaging element 1004 will be referred to as a low speed filter 1004 and the second averaging element 1006 will be referred to as a high speed filter 1006. The delay processing element 114 may further comprise a processing module 1008 for comparing a difference between the determined averages of a plurality of data packets at the outputs 1005 and 1007 of the low speed filter 1004 and the high speed filter 1006 and for determining when a change in the determined average is greater than a first threshold when a difference between the determined averages of a plurality of data packets at the outputs 1005 and 1007 of the low 1004 and high 1006 speed filter is greater than a first value. When the processing module 1008 determines that the difference between the determined averages at the outputs 1005 and 1007 of the low 1004 and high 1006 speed filters is greater than the first value, the processing module 1008 generates a first switch signal at an output 1010. The first switch signal is provided to the buffer window adjusting element 116 along with the determined averages at the outputs 1005 and 1007 of the low 1004 and high 1006 speed filters. The processing module 1008 may include a subtracting element 1012 to determine the difference Z between the determined averages at the outputs 1005 and 1007 and a comparator 1014 to compare the determined difference Z with the first value. The first value which determines the first threshold may be determined experimentally and may relate to the different rates of the first 1004 and second 1006 averaging elements.

Figure 11:
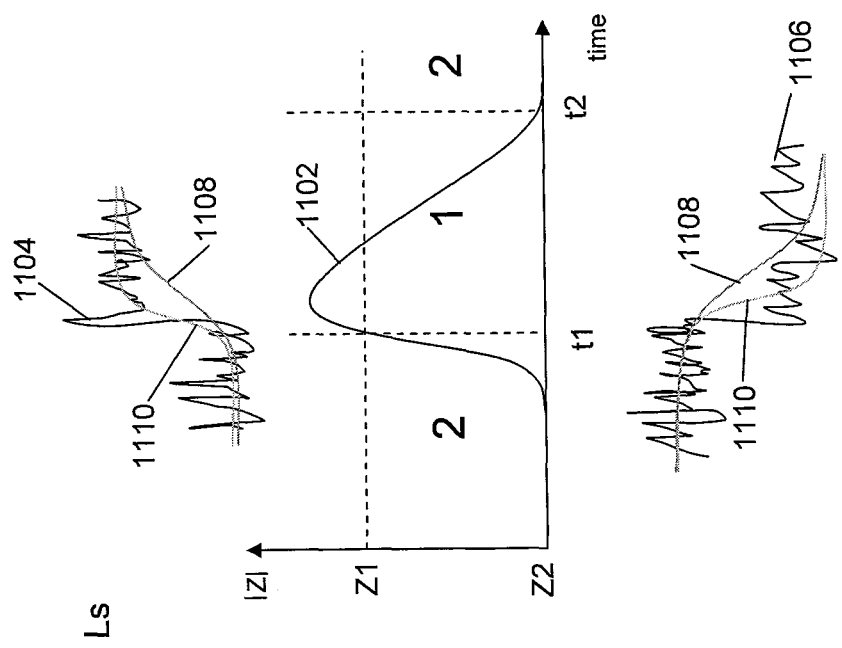
FIG. 11 is a graphical representation showing the variation over time of the absolute value of the difference Z between the outputs of the low and high speed filters of the delay processing element of FIG. 10.

FIG. 11 is a graph showing a curve 1102 which represents how the absolute value of the difference Z between the outputs of the low 1004 and high 1006 speed filters as determined by the subtracting element 1012 varies over time in an example when a difference in the determined average is greater than a first value Z1 at a time t1 which may be due to a network change which results in the change in the determined average being a positive change (e.g. the average delay increases as shown by curve 1104) or a negative change (e.g. the average delay decreases as shown in curve 1106). The output of the low speed filter 1004 is shown as curve 1108 with curves 1104 and 1106 and the output of the high speed filter 1006 is shown as curve 1110 with curves 1104 and 1106. As can be seen from curves 1108 and 1110, the output of the high speed filter 1006 responds quicker when there is a change in the determined averages compared to the output of the low speed filter 1004 which is due to their response times.

The processing module 1008 may be further arranged to generate and provide to the buffer window adjusting element at the output 1010 a second switch signal when after generating the first switch signal a difference between the determined averages of a plurality of data packets at the outputs of the first and second averaging elements reaches a second value. In FIG. 11, this is shown as occurring at time t2 when the difference between the determined averages reaches substantially zero. At time t2, the output 1005 of the low speed filter 1004 has had time to adapt to the rapid and significant change in the determined average delay as can be seen by the merging of curves 1108 with curves 1110. The second value may be determined experimentally and may relate to the different rates of the first 1004 and second 1006 averaging elements.

As discussed above, the position of the buffer window 204 is moved in time periodically, for example, when the jitter buffer 104 is called by an application element or the jitter buffer 104 is refreshed by the processing unit 108. The buffer window adjusting element 116 is arranged to adjust a position of the buffer window 204 in order to account for variations in delay. In normal operation (e.g. between 0 and t1 and after t2 in FIG. 11), the position of the buffer window 204 is adjusted at a first rate by a first amount dependent on the output of the low speed filter 1004 with the first rate being determined by the response time of the low speed filter 1004. When a change in the determined average delay is greater than the first threshold, which is indicated when the difference between the outputs of the low 1004 and high 1006 speed filters is greater than the first value Z1 at t1, the first switch signal is generated by the processing module 1008 and provided to the buffer window adjusting element 116. In response to receiving the first switch signal, the buffer window adjusting element is arranged to switch to adjust the position of the buffer window at the second rate by a second amount dependent on the output of the high speed filter 1006 with the second rate being determined by the response time of the high speed filter 1006. After generating the first switch signal, when the processing module 1008 determines a difference between the determined averages of a plurality of data packets at the outputs of the first and second averaging elements reaches a second value (for example, substantially zero at time t2 in FIG. 11), the processing module 1008 generates and provides to the buffer window adjusting element 116 the second switch signal. In response to receiving the second switch signal, the buffer window adjusting element 116 is arranged to switch to adjust the position of the buffer window from the second rate to the first rate and according to the output of the low speed filter 1004 (e.g. normal operation).

Thus, for small variations e.g. due to jitter, the output of the low speed filter 1004 is used to adjust the position of the buffer window 204 according to the response time of the low speed filter 1004 (e.g. a first rate). When there is a large change in the average delay (e.g. above the first value), the response time of the low speed filter 1004 is too slow and this may result in received data packets being missed or dropped. Thus, the output of the high speed filter 1006 is used to adjust the position of the buffer window 204 according to the response time of the high speed filter 1006 (e.g. a second rate). Although faster, the adjustments made by the high speed filter 1006 are less stable (due to filter ripple) and so the output of the high speed filter 1006 is used to adjust the position of the buffer window 204 for a short time period (t1 to t2) until the low speed filter 1004 has adapted to the change in average delay and then the low speed filter 1004 is again used to adjust the position of the window buffer 204.

In an example arrangement, the delay processing element 114 may further comprise an adjustment element 1016 for adjusting an output of the low speed filter 1004 such that the output 1005 of the low speed filter 1004 which is used to adjust the position of the buffer window 204 is an adjusted output. The adjustment element 1016 comprises a filter 1020 (referred to as an error filter) for receiving and filtering the difference between the determined averages of a plurality of data packets at outputs of the low 1004 and high 1006 speed filters provided by a difference element 1018, and a combiner for combining the filtered difference with the output of the low speed filter 1004 to provide the adjusted output. The adjustment element 1016 modifies the response time of the low speed filter 1004 so that after a period of adjustment at the higher rate according to the high speed filter 1006, the switch to the low speed filter 1004 is performed earlier than would be the case without the adjustment element 1016. This helps to reduce the time during which the less stable high speed filter 1006 is used to perform the adjustments. The low speed filter 1004 and adjustment element 1016 may alternatively be implemented by a more complex low speed filter 1004 which provides the same output as the combination of low speed filter 1004 and error filter 1020.

Figure 12:
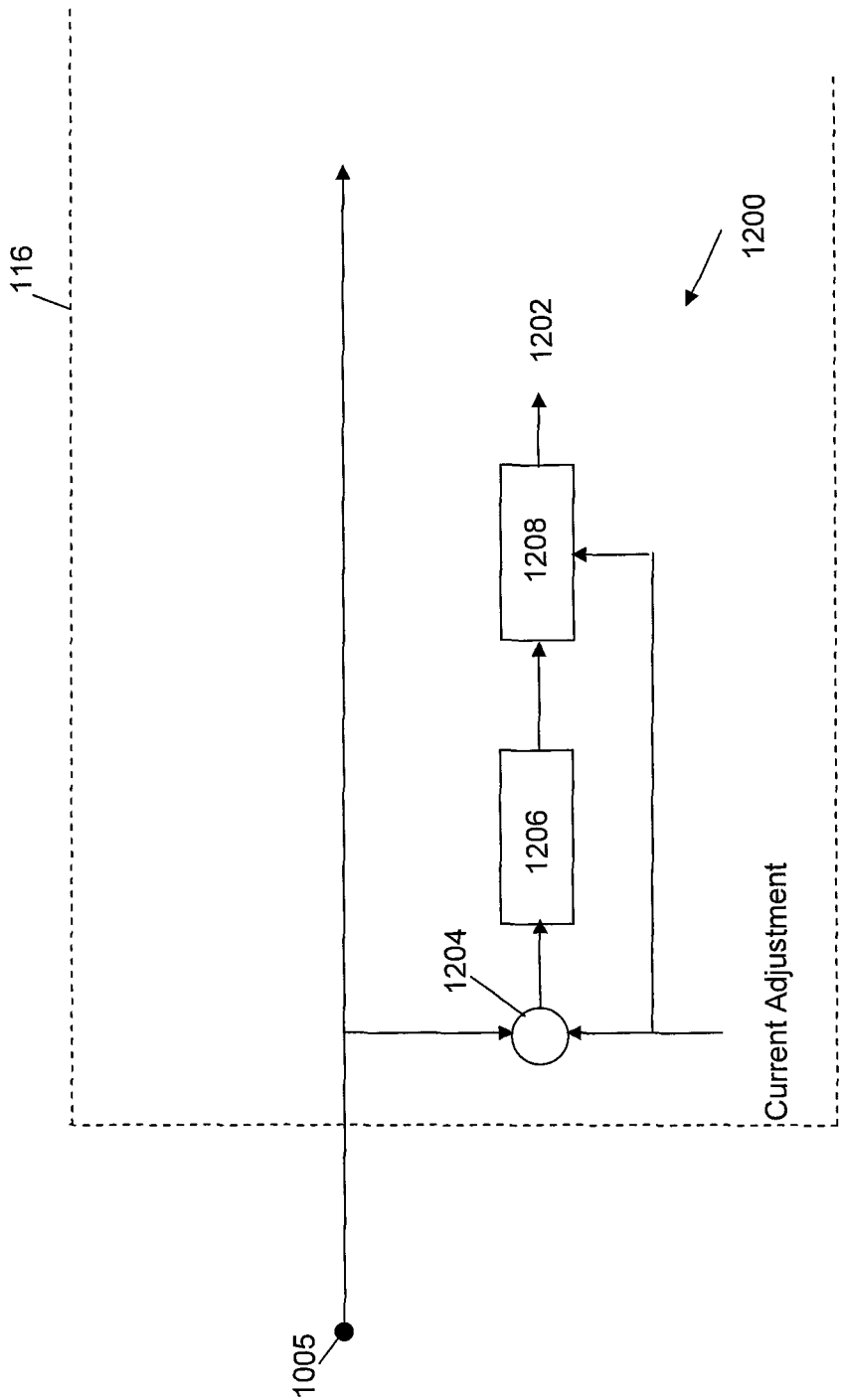
FIG. 12 is a block schematic diagram of a smoothing element in accordance with an example of an embodiment of the disclosure which is part of the buffer window adjusting element which is part of the receiving node of FIG. 1.

In an example arrangement, the buffer window adjusting element 116 may further comprise a smoothing element (an example 1200 of a smoothing element is shown in FIG. 12) for comparing a first amount which corresponds to the output 1005 of the low speed filter 1004 with a current adjustment of the buffer window 204 which determines the current position of the buffer window 204 and for providing at an output 1202 a first signal when an averaged difference between the first amount and the current adjustment is greater than a predetermined value and a second signal when the averaged difference between the first amount and the current adjustment is equal to or less than the predetermined value. In an example when the buffer window 204 is moved periodically by 5 ms increments, the predetermined value may be 5. However, other values may be used depending on a particular implementation. In response to the first signal, the buffer window adjusting element 116 is then arranged to adjust the position of the buffer window at the first rate according to the first signal and in response to the second signal, the buffer window adjusting element is arranged to not adjust the position of the buffer window from the current position. The first signal represents the current adjustment combined with an average of a difference between the adjustment according to the output 1005 of the low speed filter 1004 and the current adjustment. The smoothing element 1200 therefore helps to ensure that when the low speed filter output is used to adjust the position of the buffer window 204, the position of the buffer window 204 is not adjusted for small changes in the average delay and is adjusted only when the average delay variations exceed a threshold set by the predetermined value. This helps to avoid adjustment of the buffer window position when data packets are received only slightly late or early. This may save computational overhead.

It is noted that when a data packet is received outside the buffer window 204, the output 2005 of the low speed filter 1004 is used alone (e.g. without an output from the smoothing element 1200) to adjust the position of the window buffer 204.

In the example implementation shown in FIG. 12, the smoothing element 1200 includes a subtracting element 1204 for receiving the average delay at the output 1005 of the low speed filter 1004 and for receiving the current adjustment of the buffer window 204 which determines the current position of the buffer window 204 and which is known by the buffer window adjusting element 116, a smoothing filter 1206 for receiving the difference signal provided by the subtracting element 1204 which difference signal indicates the possible future position of the buffer window with the adjustment according to the average delay at the output 1005, and a non-linear processing element 1208 for receiving the output of the smoothing filter 1206 and for receiving the current adjustment of the buffer window 204. The smoothing filter 1206 provides an average of the difference between the adjustment according to the output 1005 of the low speed filter 1004 and the current adjustment and the non-linear processing element 1208 decides if this average difference is to be added to the current adjustment or not based on whether the average difference exceeds a threshold set by the predetermined value and provides the first signal which corresponds to the average difference at the output of the smoothing filter 1206 combined with or added to the current adjustment or the second signal at the output 1202 accordingly based on the decision. When the non-linear processing element 1208 determines that the threshold is exceeded and thus provides the first signal at the output 1202, the smoothing filter 1206 is reset and is then ready to process a new average difference. It is noted that the current position may be the result of an adjustment by the high speed filter 1006 and the buffer window adjusting element 116 has just reached the steady state and switched to adjusting the position using the low speed filter 1004.

Figure 14:
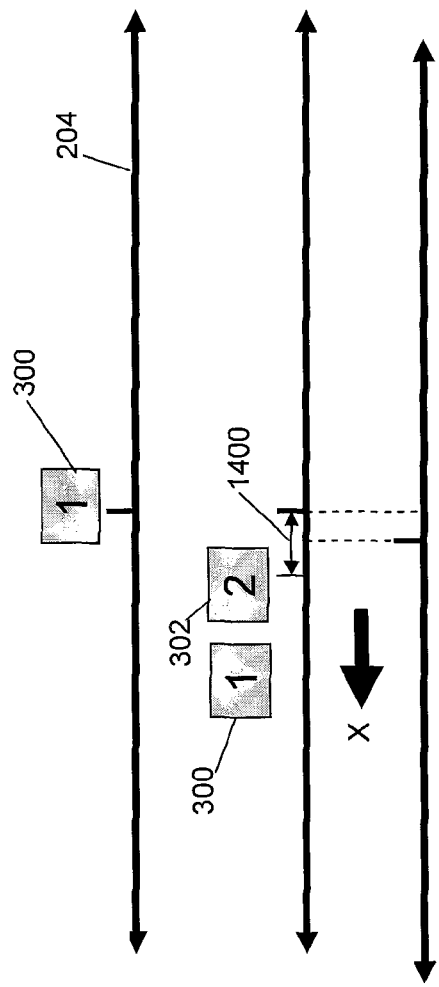
FIGS. 14-16 are schematic diagrams showing a buffer window of the jitter buffer, which is part of the receiving node of FIG. 1, in different example cases when a data packet is received too late and too early.
Figure 15:
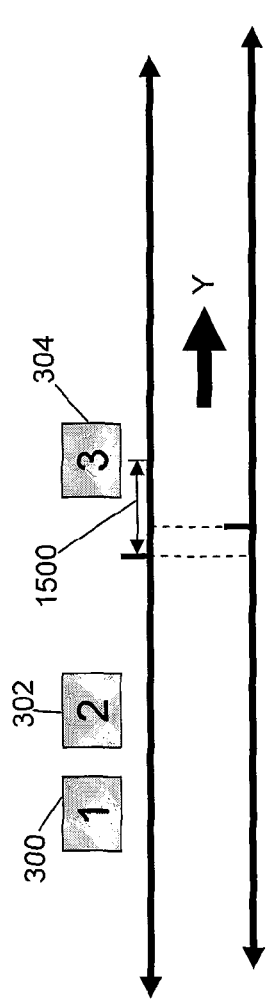
Figure 16:
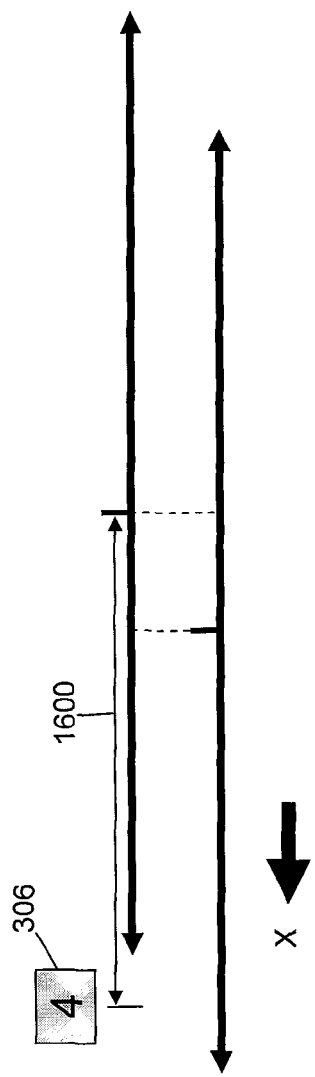

An example of a method for managing a buffer in a receiving node in accordance with the disclosure will now be described with reference to FIGS. 13-16. FIGS. 14-16 show the buffer window 204 over time in which each of four data packets 300, 302, 304, 306 are received with different amounts of jitter and how the position of the buffer window 204 is adjusted in accordance with an example method in accordance with the disclosure.

Data packets are received at the receiving node 102 at step 1300. In FIG. 14, the first data packet 300 is received and the current timestamp takes the value of the RTP timestamp in the first data packet 300. From the RTP timestamp in the first data packet 300, the receiving node 102 can then determine the estimated time of arrival of each of the second, 302, third 304 and fourth 306 data packets at the receiving node 102. The second data packet 302 is then received but as shown in FIG. 14, the second data packet 302 is received later than the estimated time of arrival. The packet delay determining element 112 determines the delay 1400 of the second data packet 302 (step 1302 in FIG. 13) and this determined delay 1400 is used by the delay processing element 114 to determine an average delay (step 1304 in FIG. 13). In the case of FIG. 14, the determined delay 1400 is not large enough to cause a change in the determined average to be greater than a first threshold (decision step 1306) and the flow passes to step 1308. The buffer window adjusting element 116 therefore uses the output of the low speed filter 1004 to adjust the position of the buffer window 204 in the direction X at the first rate and by the first amount so as compensate for the delay and to move the middle of the buffer window 204 towards when the second data packet is received. Since not all the packets have been received (step 1310), the flow returns to step 1304.

In the example described above, an average delay is determined by the low speed filter 1004 and high speed filter 1006 of the delay processing element 114. So in the case of FIG. 14, the determined delay 1400 is not large enough to cause the difference between the average delays determined by the low 1004 and high 1006 speed filters to be greater than the first value Z1 so that the first switch signal is not generated.

The third data packet 304 is then received but as shown in FIG. 15, the third data packet 304 is received earlier than the estimated time of arrival. The packet delay determining element 112 determines the delay 1500 of the third data packet 304 (step 1302 in FIG. 13) and this determined delay 1500 (which will be of the opposite sign to that of the delay 1400) is used by the delay processing element 114 to determine an average delay (step 1304 in FIG. 13). In the case of FIG. 15, the determined delay 1500 is not large enough to cause a change in the determined average to be greater than a first threshold (decision step 1306) and the flow passes to step 1308. The buffer window adjusting element 116 therefore uses the output of the low speed filter 1004 to adjust the position of the buffer window 204 in the direction Y at the first rate and by the first amount so as compensate for the delay and to move the middle of the buffer window 204 towards when the third data packet is received. Since not all the packets have been received (step 1310), the flow returns to step 1304.

The fourth data packet 306 is then received but as shown in FIG. 16, the fourth data packet 306 is received later than the estimated time of arrival and is received so late that it is out of the buffer window 204 and so the time for its release has passed. The packet delay determining element 112 determines the delay 1600 of the fourth data packet 306 (step 1302 in FIG. 13) and this determined delay 1600 is used by the delay processing element 114 to determine an average delay (step 1304 in FIG. 13). In the case of FIG. 16, the determined delay 1600 is large enough to cause a change in the determined average to be greater than a first threshold (decision step 1306) and the flow passes to step 1312. The buffer window adjusting element 116 therefore uses the output of the high speed filter 1006 to adjust the position of the buffer window 204 in the direction X at the second rate and by the second amount so as to move the middle of the buffer window 204 rapidly and by a large amount towards when the fourth data packet is received. If the time of release of the fourth data packet 306 has only just passed, then it may still be useful to the calling application element but otherwise a very late data packet will be dropped.

The output of the high speed filter 1006 is used to adjust the position of the buffer window 204 for a time period which is for example determined by when the low speed filter 1004 adapts to the change in average delay. As described in the example above, this time period is defined by when the difference between the outputs of the low 1004 and high 1006 speed filters is substantially zero. After this time period, the steady state has been reached and the low speed filter output is again used by the buffer window adjusting element 116 to adjust the position of the window buffer 204, at step 1308.

Figure 13:
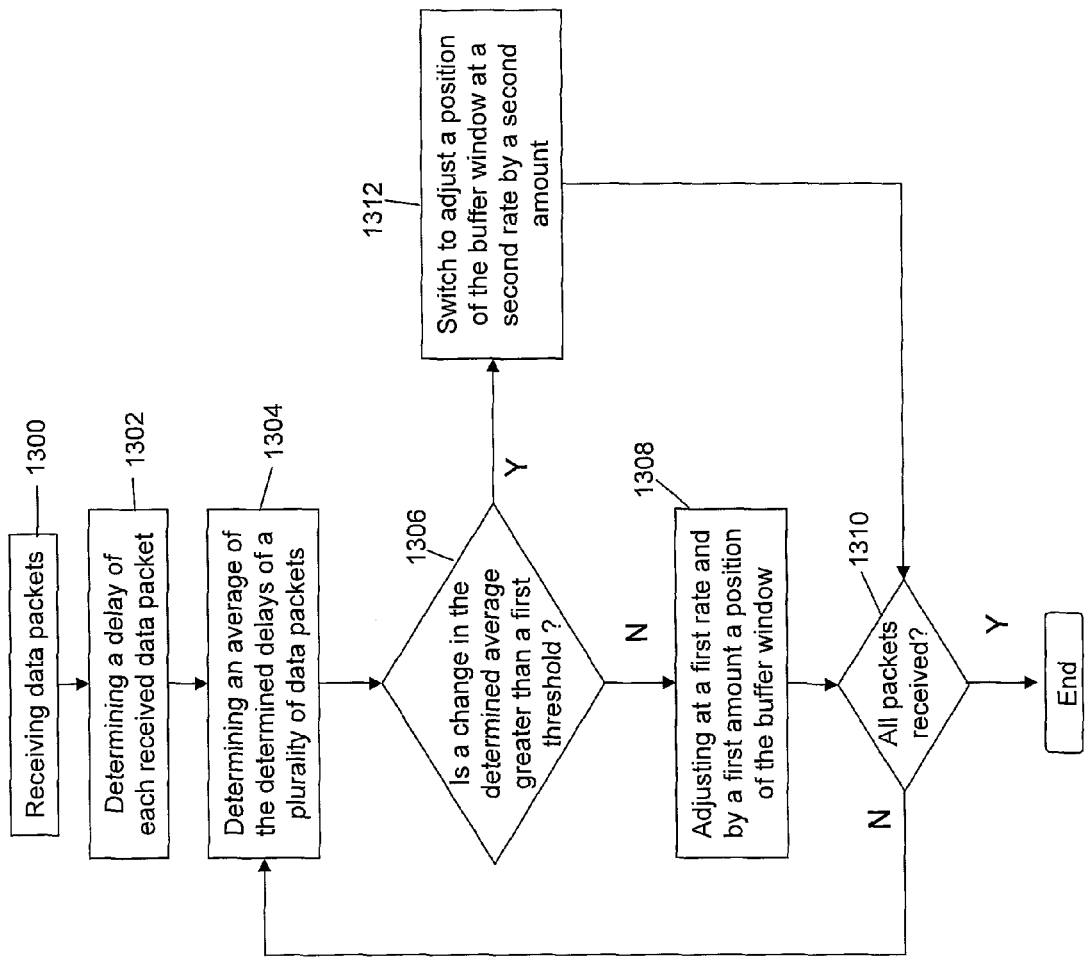
FIG. 13 is a flow chart showing an example method for managing a jitter buffer in a receiving node in a packet communications system in accordance with the present disclosure.

Although not shown in FIG. 13, the step of adjusting the buffer window 204 at the first rate and by a first amount (step 1308) may include additional steps by which the smoothing element 1200 may be used to determine whether the determined delay (e.g. 1400 or 1500) is small enough that no adjustments to the current position of the buffer window 204 are required.

Also not shown in FIG. 13, the buffer window adjusting element 116 may be further arranged for a data packet that is received outside the buffer window 204 to cause an immediate adjustment of the position of the buffer window 204 using the determined delay for that data packet without smoothing even when the determined average delay is still less than the first threshold. Once the data packet has been dealt with, the adjustment of the position of the buffer window 204 is again determined by the output of the low speed filter 1004. This applies to a particular case when one or two packets are received outside the buffer window. If there are many data packets that are received outside the buffer window, then a switch will be made to use the high speed filter 1006 as described above.

In summary, the receiving node in accordance with the disclosure may change the rate at which the position of the buffer window is adjusted to account for rapid changes in the delay of received data packets which may occur, for example, on network changes. In addition, a determination as to whether an adjustment of the buffer window is required may be performed continuously according to a first rate or when a change in the average delay exceeds a threshold according to a second rate. The first slower rate is useful for adapting slowing in the case of networks with smaller delay changes and the second faster rate is useful for adapting quickly to large network delay changes.

The receiving node and the method of managing a buffer in a receiving node in accordance with the disclosure may provide a reliable, low computational and robust solution for jitter buffers which takes account of jitter delays and also rapid and significant changes in delay due to for example network changes and thus, may handle a large variety of network conditions.

Although the disclosure has been described with respect to data packets conforming to the RTP protocol, it will be appreciated that the idea of being able to change the rate at which the position of the buffer window is adjusted so as to take account of rapid and significant changes in transmission delay can be used with data packets received at a receiving node which do not include RTP information. For example U.S. Pat. No. 7,346,005 describes how jitter delay can be calculated without the need for RTP information.

In the foregoing specification, the invention has been described with reference to specific examples of embodiments of the invention. It will, however, be evident that various modifications and changes may be made therein without departing from the broader scope of the invention as set forth in the appended claims. For instance, the receiving node may be implemented in any manner suitable for the specific implementation and, for instance be an electronic apparatus which can be connected into the network or be an integrated circuit to be implemented in such an electronic apparatus.

For example, it will be appreciated that, insofar as embodiments of the invention are implemented by a computer program, then a storage medium and a transmission medium carrying the computer program form aspects of the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system or processing device. The transmission medium may be a CD-rom, diskette or a data connection, such as a telephone cable or an IP connection.

Furthermore, some of the above embodiments, as applicable, may be implemented using a variety of different processing systems. For example, the Figures and the discussion thereof describe an exemplary architecture which is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between program elements are merely illustrative and that alternative embodiments may merge elements or impose an alternate decomposition of functionality upon various elements.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A receiving node for receiving data packets in a packet communications system, comprising:
   a buffer for storing data packets received at the receiving node and for releasing the stored data packets to an application element of the receiving node, wherein a buffer window defines a time period in which data packets are received at the buffer, a position of the buffer window is moved in time periodically, and a stored data packet is released when it is at an end of the buffer window;

a packet delay determining element for determining, for each received data packet, a delay of a received data packet by determining the difference between an estimated time of arrival of a data packet at the receiving node and an actual time of arrival of the data packet at the receiving node;

a delay processing element for determining an average of the determined delays of a plurality of data packets and for determining when a change in the determined average is greater than a first threshold; and a buffer window adjusting element for adjusting at a first rate a position of the buffer window by a first amount dependent on the determined average of the determined delays and for switching to adjust a position of the buffer window at a second rate by a second amount dependent on the determined average when a change in the determined average is greater than the first threshold, the second rate being greater than the first rate.

2. The receiving node according to claim 1, wherein the delay processing element comprises:

a first averaging element having a first response time for determining and providing at an output an average of the determined delays of a plurality of data packets, wherein the first amount by which the position of the buffer window is adjusted is dependent on the output of the first averaging element; and a second averaging element having a second response time for determining and providing at an output an average of the determined delays of the plurality of data packets, the second response time being faster than the first, wherein the second amount by which the position of the buffer window is adjusted is dependent on the output of the second averaging element.

3. The receiving node according to claim 2, wherein the delay processing element further comprises a processing module for comparing a difference between the determined averages of a plurality of data packets at the outputs of the first and second averaging elements and for determining when a change in the determined average is greater than the first threshold when a difference between the determined averages of a plurality of data packets at the outputs of the first and second averaging elements is greater than a first value and for generating and providing to the buffer window adjusting element a first switch signal in response, the buffer window adjusting element being arranged to switch to adjust the position of the buffer window at the second rate in response to receiving the first switch signal.

4. The receiving node according to claim 3 wherein the processing module is further arranged to generate and provide to the buffer window adjusting element a second switch signal when after generating the first switch signal a difference between the determined averages of a plurality of data packets at the outputs of the first and second averaging elements reaches a second value, the buffer window adjusting element being arranged to switch to adjust the position of the buffer window from the second rate to the first rate in response to receiving the second switch signal.

5. The receiving node according to claim 4, wherein the second value is substantially zero.

6. The receiving node according to claim 2, wherein the buffer window adjusting element further comprises a smoothing element for comparing a first amount dependent on the output of the first averaging element with a current adjustment of the buffer window, the current adjustment determining the current position of the buffer window, and for providing a first signal at an output when an averaged difference between the first amount and the current adjustment is greater than a predetermined value and a second signal when the averaged difference between the first amount and the current adjustment is equal to or less than the predetermined value, and wherein the buffer window adjusting element is further arranged to adjust the position of the buffer window at the first rate according to the first signal in response to the first signal at the output and to not adjust the position of the buffer window from the current position in response to the second signal at the output.

7. The receiving node according to claim 2, wherein the delay processing element further comprises an adjustment element for adjusting the output of the first averaging element such that the first amount by which the position of the buffer window is adjusted is dependent on an adjusted output, the adjustment element comprising a filter for receiving and filtering the difference between the determined averages of a plurality of data packets at the outputs of the first and second averaging elements, and a combiner for combining the filtered difference with the output of the first averaging element to provide the adjusted output.

8. The receiving node according to claim 3, wherein the buffer window adjusting element further comprises a smoothing element for comparing a first amount dependent on the output of the first averaging element with a current adjustment of the buffer window, the current adjustment determining the current position of the buffer window, and for providing a first signal at an output when an averaged difference between the first amount and the current adjustment is greater than a predetermined value and a second signal when the averaged difference between the first amount and the current adjustment is equal to or less than the predetermined value, and wherein the buffer window adjusting element is further arranged to adjust the position of the buffer window at the first rate according to the first signal in response to the first signal at the output and to not adjust the position of the buffer window from the current position in response to the second signal at the output.

9. The receiving node according to claim 4, wherein the buffer window adjusting element further comprises a smoothing element for comparing a first amount dependent on the output of the first averaging element with a current adjustment of the buffer window, the current adjustment determining the current position of the buffer window, and for providing a first signal at an output when an averaged difference between the first amount and the current adjustment is greater than a predetermined value and a second signal when the averaged difference between the first amount and the current adjustment is equal to or less than the predetermined value, and wherein the buffer window adjusting element is further arranged to adjust the position of the buffer window at the first rate according to the first signal in response to the first signal at the output and to not adjust the position of the buffer window from the current position in response to the second signal at the output.

10. The receiving node according to claim 5, wherein the buffer window adjusting element further comprises a smoothing element for comparing a first amount dependent on the output of the first averaging element with a current adjustment of the buffer window, the current adjustment determining the current position of the buffer window, and for providing a first signal at an output when an averaged difference between the first amount and the current adjustment is greater than a predetermined value and a second signal when the averaged difference between the first amount and the current adjustment is equal to or less than the predetermined value, and wherein the buffer window adjusting element is further arranged to adjust the position of the buffer window at the first rate according to the first signal in response to the first signal at the output and to not adjust the position of the buffer window from the current position in response to the second signal at the output.

11. The receiving node according to claim 3, wherein the delay processing element further comprises an adjustment element for adjusting the output of the first averaging element such that the first amount by which the position of the buffer window is adjusted is dependent on an adjusted output, the adjustment element comprising a filter for receiving and filtering the difference between the determined averages of a plurality of data packets at the outputs of the first and second averaging elements, and a combiner for combining the filtered difference with the output of the first averaging element to provide the adjusted output.

12. The receiving node according to claim 4, wherein the delay processing element further comprises an adjustment element for adjusting the output of the first averaging element such that the first amount by which the position of the buffer window is adjusted is dependent on an adjusted output, the adjustment element comprising a filter for receiving and filtering the difference between the determined averages of a plurality of data packets at the outputs of the first and second averaging elements, and a combiner for combining the filtered difference with the output of the first averaging element to provide the adjusted output.

13. The receiving node according to claim 5, wherein the delay processing element further comprises an adjustment element for adjusting the output of the first averaging element such that the first amount by which the position of the buffer window is adjusted is dependent on an adjusted output, the adjustment element comprising a filter for receiving and filtering the difference between the determined averages of a plurality of data packets at the outputs of the first and second averaging elements, and a combiner for combining the filtered difference with the output of the first averaging element to provide the adjusted output.

14. The receiving node according to claim 5, wherein the delay processing element further comprises an adjustment element for adjusting the output of the first averaging element such that the first amount by which the position of the buffer window is adjusted is dependent on an adjusted output, the adjustment element comprising a filter for receiving and filtering the difference between the determined averages of a plurality of data packets at the outputs of the first and second averaging elements, and a combiner for combining the filtered difference with the output of the first averaging element to provide the adjusted output.

15. A method of managing a buffer in a receiving node in a packet communications system, the buffer for storing data packets received at the receiving node and for releasing the stored data packets to an application element of the receiving node, wherein a buffer window defines a time period in which data packets are received at the buffer, a position of the buffer window is moved in time periodically by a predetermined amount, and a stored data packet is released when it is at an end of the buffer window, the method comprising:

receiving data packets at the receiving node;
determining, for each received data packet, a delay of a received data packet by determining the difference between an estimated time of arrival of a data packet at the receiving node and an actual time of arrival of the data packet at the receiving node;
determining an average of the determined delays of a plurality of data packets;
determining when a change in the determined average is greater than a first threshold;
adjusting at a first rate a position of the buffer window by a first amount dependent on the determined average of the determined delays; and
switching to adjust a position of the buffer window at a second rate by a second amount dependent on the determined average when a change in the determined average is greater than the first threshold, the second rate being greater than the first rate.

16. A communications device comprising:
a receiving node for receiving data packets comprising:
a buffer for storing data packets received at the receiving node and for releasing the stored data packets to an application element of the receiving node, wherein a buffer window defines a time period in which data packets are received at the buffer, a position of the buffer window is moved in time periodically, and a stored data packet is released when it is at an end of the buffer window;
a packet delay determining element for determining, for each received data packet, a delay of a received data packet by determining the difference between an estimated time of arrival of a data packet at the receiving node and an actual time of arrival of the data packet at the receiving node;
a delay processing element for determining an average of the determined delays of a plurality of data packets and for determining when a change in the determined average is greater than a first threshold; and
a buffer window adjusting element for adjusting at a first rate a position of the buffer window by a first amount dependent on the determined average of the determined delays and for switching to adjust a position of the buffer window at a second rate by a second amount dependent on the determined average when a change in the determined average is greater than the first threshold, the second rate being greater than the first rate.

17. The communications device of claim 16, wherein the delay processing element comprises:
a first averaging element having a first response time for determining and providing at an output an average of the determined delays of a plurality of data packets, wherein the first amount by which the position of the buffer window is adjusted is dependent on the output of the first averaging element; and
a second averaging element having a second response time for determining and providing at an output an average of the determined delays of the plurality of data packets, the second response time being faster than the first, wherein the second amount by which the position of the buffer window is adjusted is dependent on the output of the second averaging element.

18. The communications device of claim 16, wherein the delay processing element further comprises a processing module for comparing a difference between the determined averages of a plurality of data packets at the outputs of the first and second averaging elements and for determining when a change in the determined average is greater than the first threshold when a difference between the determined averages of a plurality of data packets at the outputs of the first and second averaging elements is greater than a first value and for generating and providing to the buffer window adjusting element a first switch signal in response, the buffer window adjusting element being arranged to switch to adjust the position of the buffer window at the second rate in response to receiving the first switch signal.

19. The communications device of claim 18, wherein the processing module is further arranged to generate and provide to the buffer window adjusting element a second switch signal when after generating the first switch signal a difference between the determined averages of a plurality of data packets at the outputs of the first and second averaging elements reaches a second value, the buffer window adjusting element being arranged to switch to adjust the position of the buffer window from the second rate to the first rate in response to receiving the second switch signal.

20. The communications device of claim 19, wherein the second value is substantially zero.

* * * * *